United States Patent
Babazadeh et al.

(10) Patent No.: US 11,502,607 B2
(45) Date of Patent: Nov. 15, 2022

(54) METHODS AND APPARATUSES FOR AUXILIARY TRANSIENT CONTROL SYSTEM

(71) Applicant: Alpha and Omega Semiconductor (Cayman) Limited, Grand Cayman (KY)

(72) Inventors: Amir Babazadeh, Laguna Hills, CA (US); Demetri Giannopoulos, Sunnyvale, CA (US); Chris Young, Round Rock, TX (US)

(73) Assignee: Alpha and Omega Semiconductor (Cayman) Limited, Grand Cayman (KY)

( * ) Notice: Subject to any disclaimer, the term of this patent is extended or adjusted under 35 U.S.C. 154(b) by 75 days.

(21) Appl. No.: 16/662,798

(22) Filed: Oct. 24, 2019

(65) Prior Publication Data
US 2021/0126540 A1 Apr. 29, 2021

(51) Int. Cl.
H02M 3/158 (2006.01)
H02M 3/157 (2006.01)

(52) U.S. Cl.
CPC ......... *H02M 3/1588* (2013.01); *H02M 3/157* (2013.01)

(58) Field of Classification Search
CPC ................. H02M 3/157; H02M 3/155–1588
See application file for complete search history.

(56) References Cited

U.S. PATENT DOCUMENTS

| | | | |
|---|---|---|---|
| 8,917,072 B2 | 12/2014 | Wan et al. | |
| 9,379,709 B2* | 6/2016 | Nguyen | H03K 19/017509 |
| 9,787,179 B1* | 10/2017 | Clarkin | H02M 3/158 |
| 10,243,449 B1* | 3/2019 | Young | H02M 1/14 |
| 10,454,370 B2* | 10/2019 | Babazadeh | H02M 3/1582 |
| 2014/0160804 A1* | 6/2014 | Sato | H02M 3/33507 363/21.01 |
| 2017/0257031 A1* | 9/2017 | Shao | H02M 3/1582 |
| 2018/0331682 A1* | 11/2018 | Duduman | H02M 3/07 |
| 2019/0041452 A1* | 2/2019 | Chang | H03K 19/017581 |
| 2019/0288603 A1* | 9/2019 | Babazadeh | H02M 3/1588 |

OTHER PUBLICATIONS

The MOSFET, n.d., 13 pages, U.S.

* cited by examiner

*Primary Examiner* — Peter M Novak
(74) *Attorney, Agent, or Firm* — Craige Thompson; Thompson Patent Law; Timothy D. Snowden

(57) ABSTRACT

Apparatus and associated methods relate to providing an integrated circuit package having (a) a bypass circuit in parallel with an inductor and (b) a logic circuit configured to control the bypass circuit for conductivity modulation. In an illustrative example, in response to a corresponding load transient, the logic circuit may include a state machine configured to generate different control signals for the bypass circuit to control the timing and/or quantity of energy transfer from the inductor to a load. The bypass circuit may include a first semiconductor switch and a second semiconductor switch connected in anti-series. In some implementations, the power stage and the bypass circuit may be operated, for example, in numerous operational modes to dynamically modulate conductivity across the terminals of the inductor in a power supply to advantageously result in a smaller undershoot and overshoot.

21 Claims, 12 Drawing Sheets

Instant Clamp Mode (IC)

US 11,502,607 B2

METHODS AND APPARATUSES FOR AUXILIARY TRANSIENT CONTROL SYSTEM

TECHNICAL FIELD

Various embodiments relate generally to transient control systems.

BACKGROUND

Electronic devices, which may also be referred to as loads, receive power from a variety of electrical power sources. For example, some power sources may be coupled to a load device at a wall outlet (e.g., from a mains source) or may couple more directly to various local and/or portable sources (e.g., batteries, renewable energy sources, generators). Some load devices, such as central processing units (CPU) and graphics processors (GPU) continue to develop higher input current requirements while demanding tight voltage regulation and/or high efficiency from the power source.

In some electronic devices, the source voltage supply (e.g., battery input, rectified mains supply, intermediate DC supply) may be converted to a load compatible voltage by various voltage conversion circuits. Switch-mode power supplies have gained popularity as voltage conversion circuits due to their high efficiency and therefore are often used to supply a variety of electronic loads.

Switch-mode power supplies convert voltages using switching devices that turn on with very low resistance and turn off with very high resistance. Switch-mode power supplies may charge an output inductor during a period of time and may release part or all of the inductor energy during a subsequent period of time. The output energy may be delivered to a bank of output capacitors, which provide the filtering to produce a DC output voltage. In buck-derived switch-mode power supplies, the output voltage, in a steady state, may be approximately the input voltage times a duty cycle, where the duty cycle is the duration of the on-time of a pass switch divided by the total on-time and off-time of the pass switch for one switching cycle.

SUMMARY

Apparatus and associated methods relate to providing an integrated circuit package having (a) a bypass circuit in parallel with an inductor and (b) a logic circuit configured to control the bypass circuit for conductivity modulation. In an illustrative example, in response to a corresponding load transient, the logic circuit may include a state machine configured to generate different control signals for the bypass circuit to control the timing and/or quantity of energy transfer from the inductor to a load. The bypass circuit may include a first semiconductor switch and a second semiconductor switch connected in anti-series. In some implementations, the power stage and the bypass circuit may be operated, for example, in numerous operational modes to dynamically modulate conductivity across the terminals of the inductor in a power supply to advantageously result in a smaller undershoot, overshoot and a faster transient response.

Various embodiments may achieve one or more advantages. For example, a stand-alone transient booster integrated circuit which is compatible with available controllers may provide lots of advantageous to improve the performances of available DC-DC controllers. Some embodiments may provide a smaller undershoot and overshoot which in turn may save a lot on the output capacitor. Reduction of output capacitance may achieve one or more advantages. For example, capacitance reduction may reduce cost, required board space, weight, assembly cost, assembly time, product reliability, and product longevity.

Some implementations may advantageously reduce or substantially avoid excess energy flow into the load, which may improve the reliability and performance of the load. Some embodiments may allow selective and smart release of energy stored in the inductor for controlled release at a predetermined rate to the output capacitor after a load dump. In some examples, excess energy may be controllably dissipated to handle the effects of a load dump. Some implementations may protect load circuits by, for example, clamping an output voltage in case of an excess voltage deviation on the output capacitor. In some embodiments, the stand-alone transient booster integrated circuit may override or augment the controller output and provide improved transient response.

In some embodiments, the operation modes of the integrated circuit may be selected dynamically (e.g., by the controller) or statically (e.g., by a resistor divider or pin strapping technique) to increase the efficiency of various switch-mode power supplies. Various methods implemented with an IC may make more efficient use of energy stored in an output inductor, when an output load demand suddenly changes, for example, such as through bidirectional current capability through the bypass circuit that is in parallel with the inductor. Accordingly, a stand-alone IC may substantially mitigate transient output voltage peaks and valleys on an output voltage supply of various switch-mode power supplies. Various ICs may reduce the amount of output capacitance required on various switch-mode power supplies. Various ICs may reduce the size, weight, and cost of transient voltage suppression on output voltage supplies of various switch-mode power supplies.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an intelligent energy management integrated circuit (IEM IC) and an exemplary implementation in a representative computing product is briefly introduced with reference to FIG. 1. Second, with reference to FIGS. 2A-2B, the discussion turns to exemplary embodiments that illustrate the architecture of the IEM IC and the method to implement the IEM IC. Then, with reference to FIGS. 4-6B, further explanatory discussion is presented to explain different operation modes of the IEM IC and a power stage in a voltage regulator. Finally, with reference to FIGS. 7A-7C, the discussion turns to exemplary embodiments that illustrate the architecture of a gate control circuit and timing diagrams of corresponding signals received and generated by the gate control circuit.

DC-to-DC voltage conversion is often performed by switch-mode voltage regulators, also referred to as voltage converters or point-of-load (POL) regulators/converters. One type of DC-to-DC converter, called a buck or step-down regulator, may convert a higher voltage (e.g., 12V) to a lower value as required by one or more load devices. More generally, voltage regulators and current regulators are commonly referred to as power converters, and as used herein, the term power converter is meant to encompass such devices.

Figure 1:
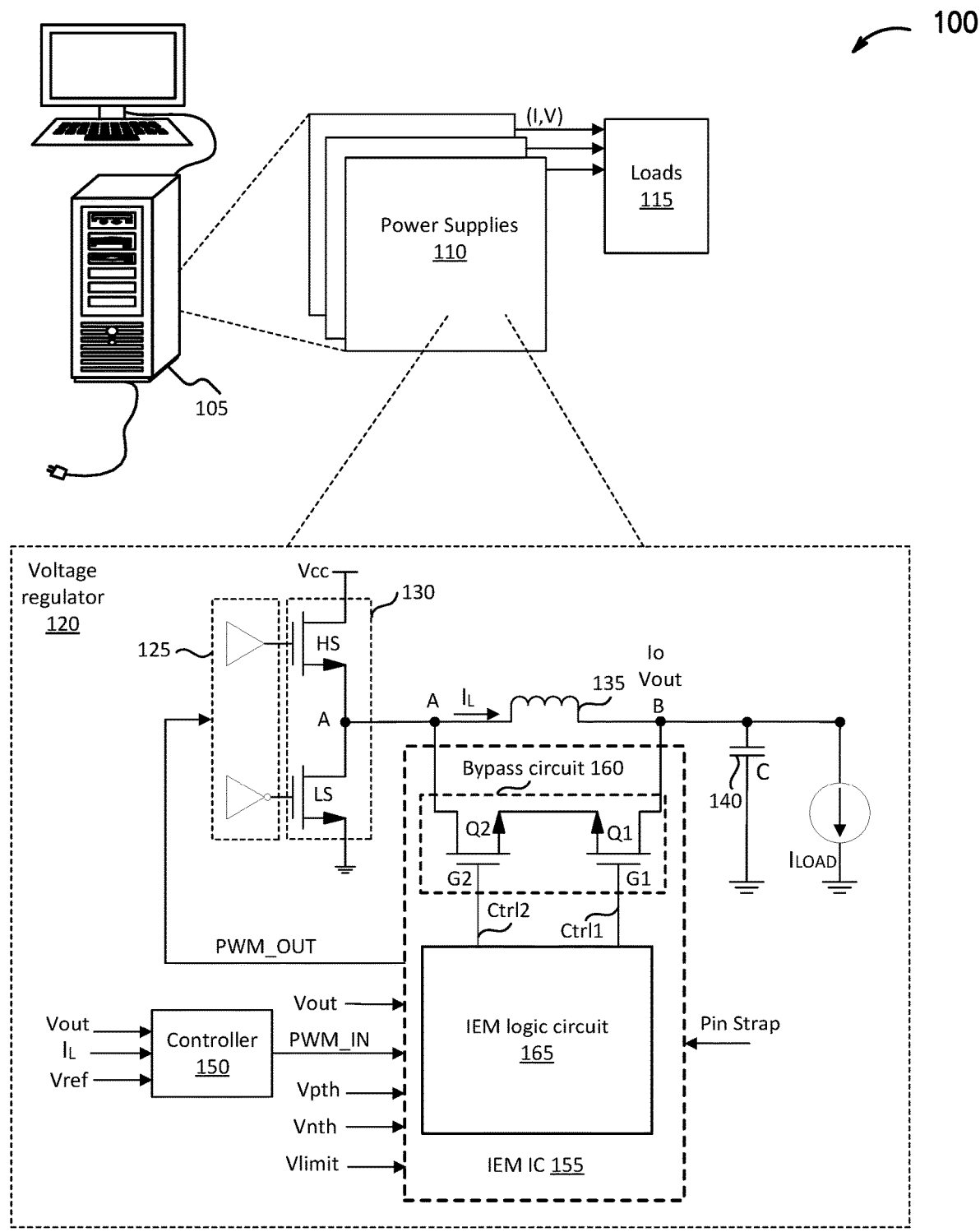
FIG. 1 depicts an exemplary intelligent energy management integrated circuit (IEM IC) managing a transient load response of a switch-mode power supply.

FIG. 1 depicts an exemplary intelligent energy management integrated circuit (IEM IC) managing a transient load response of a switch-mode power supply.

In this depicted example, a system 100 includes a powered load system 105. The powered load system 105 includes one or more interleaved power supplies 110 implemented in the powered load system 105 supplying one or more loads (e.g., CPU) 115. In some examples, the loads 115 may be specified to operate at an input voltage with limited voltage perturbations.

The power supplies 110 include a voltage regulator 120. The voltage regulator 120 regulates currents and/or voltages supplied into the loads 115. The voltage regulator 120 is configured to dynamically modulate the frequency of a switch signal to achieve a fast transient response. More specifically, the voltage regulator 120 includes a driver circuit 125 configured to drive a switched-mode power stage 130. The driver circuit 125 is configured to receive a pulse-width-modulated (PWM) signal.

The power stage 130 includes a high-side switch (e.g., a MOSFET) HS and a low side switch LS. In this depicted example, both the HS and the LS are N-type metal-oxide-semiconductor field-effect-transistors (NMOSFETs). The drain of the HS is coupled to receive a predetermined power $V_{CC}$, and the source of the HS is coupled to an intermediate node A. The drain of the LS is coupled to the intermediate node A and the source of the LS is coupled to a reference voltage level (e.g., GND). The low-side switch LS may be a synchronous rectifier, for example.

The voltage regulator 120 also includes an inductor 135 with one terminal of the inductor 135 is coupled to the intermediate node A. The voltage regulator 120 also includes a capacitor 140 coupled to the other terminal of the inductor 135 through an output node B. An output voltage $V_{OUT}$ at the output node B is then received by the loads 115.

The voltage regulator 120 also includes a controller 150 configured to receive a reference voltage $V_{ref}$ and the output voltage $V_{OUT}$ and generate a pulse-width-modulated (PWM) signal PWM_IN. The PWM_IN signal and the output voltage $V_{OUT}$ are received by an intelligent energy management (IEM) integrated circuit (IC) 155. The IEM IC 155 includes a bypass circuit 160 with two terminals of the bypass circuit 160 coupled to the intermediate node A and the output node B.

In this depicted example, the bypass circuit 160 includes a first transistor Q1 and a second transistor Q2 connected in anti-series. Q1 and Q2 are all NMOSFETs. The drain of Q1 is coupled to the output node B, the drain of Q2 is coupled to the intermediate node A, and the source of Q1 is coupled to the source of Q2. The gate of Q1 is controlled by a first gate control signal Ctrl1 and the gate of Q2 is controlled by a second gate control signal Ctrl2. By applying different gate control signals to a transistor (e.g., Q1 and Q2), the transistor may work in different modes (e.g., ohmic mode, saturation mode, and cut-off mode).

The voltage regulator 120 also includes an IEM logic circuit 165 coupled to the bypass circuit 160. In this depicted example, the IEM logic circuit 154 receives the output voltage $V_{OUT}$, the PWM_IN signal, a predetermined positive threshold voltage $V_{pth}$, a predetermined negative threshold voltage $V_{nth}$ and a predetermined limit voltage $V_{limit}$ to generate a PWM signal PWM_OUT to be received by the driver circuit 125 and the first gate control signal Ctrl1 and the second gate control signal Ctrl2 to be received by the bypass circuit 160.

In this depicted example, the IEM IC 155 is a packaged module. The packaged module includes a housing or enclosure (not shown), the IEM logic circuit 165 and the bypass circuit 160 may be arranged in the housing or the enclosure, or on a common substrate (e.g., hybrid circuit or die). Pins may be used to input/output signals to/from the packaged module. In some embodiments, a discrete (e.g., wound wire) bypass circuit 160 may be packaged with the IEM logic circuit 165 in a unitary object, such as by potting. For example, epoxy, elastomer, plastic or other suitable conformable materials may bind or encase the components into a single packaged object. In various implementations, by way of example and not limitation, a housing or enclosure may be formed by dipping, potting, spraying, electrostatic operation, or injection molding. Thus, as the unitary IC 155 is compatible with different controllers, the unitary IC 155 may be operatively coupled to different power stages and inductors to dynamically control the output voltage $V_{OUT}$.

By generating different PWM_OUT signal and different gate control signals Ctrl1 and Ctrl2, the power stage 130 and the bypass circuit 160 may work in different modes. Therefore, the energy (e.g., $V_{OUT}$) flow into the load 115 may be dynamically controlled in response to a load transient. For example, in response to an undershoot, the PWM_OUT may be set to high and the Ctrl1, Ctrl2 are, for example, 1.5V. Accordingly, the high-side switch HS, Q1 and Q2 may be turned on and the output voltage at the output node B may be charged quickly to improve the transient event response. Different working modes of the power stage 130 and the bypass circuit 160 are discussed with reference to FIG. 2B and FIGS. 4-6 in detail.

Figure 2A:
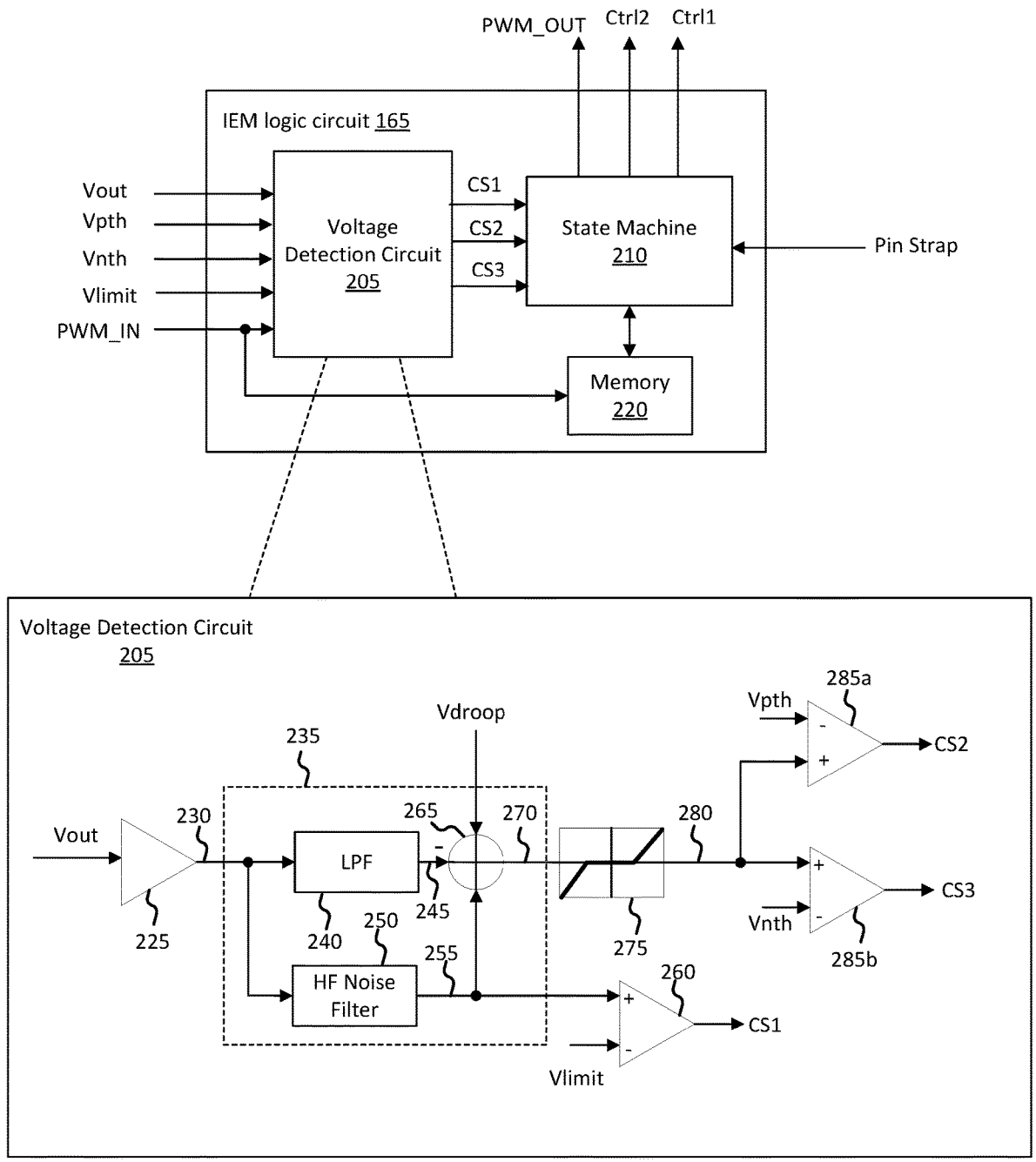
FIG. 2A depicts an architecture of an exemplary IEM logic implemented in the IEM IC.

FIG. 2A depicts an architecture of an exemplary IEM logic circuit implemented in the IEM IC. In this depicted example, the IEM logic circuit 165 includes a voltage detection circuit 205 configured to receive the output voltage $V_{OUT}$, the PWM_IN signal, $V_{pth}$, $V_{nth}$ and $V_{limit}$ to generate three comparison results CS1, CS2, and CS3. A state machine 210 is coupled to receive the three comparison results CS1, CS2, and CS3 and execute program of instructions in a memory 220 to perform operations to generate the PWM_OUT signal, the first gate control signal Ctrl1 and the second gate control signal Ctrl2 to enable the power stage 130 and the bypass circuit 160 work in different operation modes. For example, in response to different PWM_IN signal and comparison results, the state machine 210 may work in different modes to generate different signals (e.g., PWM_OUT, Ctrl1, Ctrl2). For example, when the state machine 210 works in a bypass mode, the PWM_IN signal is outputted from the state machine 210 and received by the driver circuit 125, transistors Q1 and Q2 in the bypass circuit 160 are turned off by corresponding gate control signals. When the state machine 210 works in an instant clamp mode, the state machine 210 may retrieve a second set of signals to clamp the output voltage at $V_{limit}$. The operation of the state machine 210 is discussed in detail with reference to FIG. 2B.

In this depicted example, the voltage detection circuit 205 includes a first amplifier 225 configured to amplify the output voltage $V_{OUT}$ to generate a first amplified signal 230. In some embodiments, the first amplifier 225 may be optional. The first amplified signal 230 is then processed by a band-pass filter 235 to generate a first error signal 270 and a first processed signal 255. More specifically, the band pass filter 235 includes a low-pass filter (LPF) 240 (e.g., band width 10-20 KHz) configured to receive the first amplified signal 230 and generate a direct current (DC) signal (e.g., a reference signal) 245. The band width of the LPF 240 may be changed to generate a different DC signal to mimic the change of the reference voltage $V_{ref}$. In some embodiments, the voltage detection circuit 205 may also include a load line (not shown), and a droop voltage signal $V_{droop}$ may be received by the subtractor circuit 265. The droop voltage signal $V_{droop}$ may be used to further adjust the DC signal 245. In some embodiments, the droop voltage signal $V_{droop}$ may be a function of the output current $1_O$.

The band pass filter 235 also includes a high-frequency noise filter 250 (e.g., band width 5-10 MHz) configured to receive the first amplified signal 230 and remove noise from the amplified output voltage to generate a first processed signal 255. A subtractor circuit 265 subtracts the DC signal 245 from the first processed signal 255 to generate a first error signal 270.

The voltage detection circuit 205 also includes a first comparator 260 configured to compare the first processed signal 255 with the $V_{limit}$ to generate the first comparison signal CS1. The $V_{limit}$ may be a predetermined maximum voltage that may be applied to the loads 115. If the first processed signal 255 is no less than the $V_{limit}$, the IEM logic circuit 165 may instantly clamp the output of the voltage regulator to prevent a large output voltage $V_{OUT}$ from applying to the loads 115. Therefore, the reliability of the loads 115 may be advantageously improved.

In this depicted example, the voltage detection circuit 205 also includes a second amplifier 275 with a dead zone configured to amplify the first error signal 270 to generate a second amplified signal 280. If the first error signal 270 is ranged within the dead zone (e.g., ripples), the second amplifier 275 may be amplified with a first gain (e.g., 0). If the first error signal 270 is not ranged within the dead zone (e.g., ripples), the first error signal 270 may be amplified with a second gain (e.g., 1). In some embodiments, the second amplifier 275 may be optional.

The voltage detection circuit 205 also includes a second comparator 285a and a third comparator 285b configured to compare the second amplified signal 280 with the predetermined positive threshold voltage $V_{pth}$ and the predetermined negative threshold voltage $V_{nth}$, respectively, to generate the second comparison result CS2 and the third comparison results CS3. The state machine 210 receives the three comparison results CS1, CS2, CS3 and retrieves instructions from the memory 220 to perform operations to generate or retrieve corresponding gate control signals and PWM_OUT signal to dynamically control the operation of the voltage regulator 120. Thus, the energy (e.g., $V_{OUT}$) flow into the load 115 may be dynamically controlled in response to a load transient.

In some embodiments, the PWM_IN signal may be stored in the memory 220. In some embodiments, different configuration settings of the PWM_OUT signal, the first and second gate control signals Ctrl1 and Ctrl2 may be stored in the memory 220. One or more look-up tables may be used to contain the conditions of triggering different modes and corresponding configuration settings.

In some embodiments, the predetermined positive threshold voltage $V_{pth}$, the predetermined negative threshold voltage $V_{nth}$ and the predetermined limit voltage $V_{limit}$ may be stored in the memory 220 and the state machine 210 may instruct the voltage detection circuit 205 to receive the pre-stored $V_{pth}$, $V_{nth}$, and $V_{limit}$ and conduct the comparison.

In some embodiments, the state machine 210 may also receive a pin strap signal. The pin strap signal may enable the state machine 210 to generate a set of signals corresponding to different operation modes of the power stage 130 and the bypass circuit 160. The pin strap signal may be generated by a resistor divider (not shown) or may be generated by the controller 150. In some embodiments, pin strap technique may be used to configure the controller 150 and determine the mode of operation. In some embodiments, a dynamic way of controlling the modes of operation may be achieved by communication between the main controller 150 and the IEM IC 155.

Figure 2B:
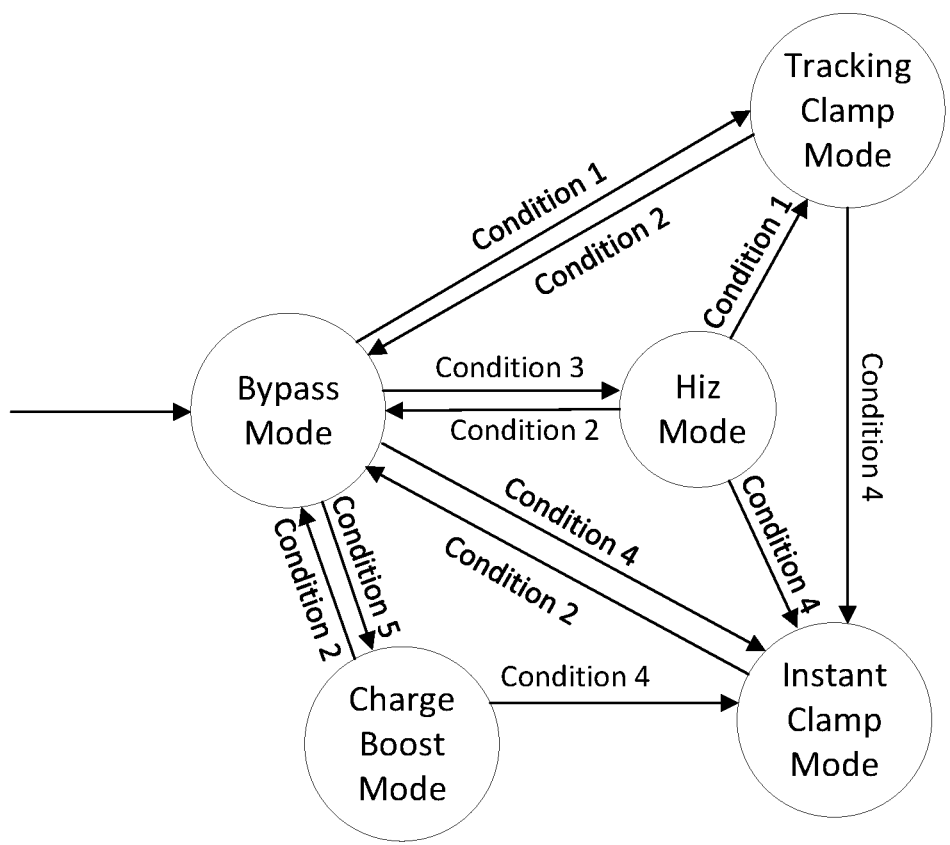
FIG. 2B depicts an exemplary state diagram of a state machine implemented in the IEM logic.

FIG. 2B depicts an exemplary state diagram of a state machine implemented in the IEM logic. In this depicted example, the state machine 210 may be configured to work in five different modes in response to different conditions. The state machine 210 may then generate five different set of signals to enable the voltage regulator work in five different modes.

When the IEM IC 155 is enabled, the state machine 210 may work in a Bypass mode as a default mode. When the state machine 210 is in default mode, the PWM_IN signal is directly outputted by the IEM IC 155 (e.g., PWM_IN=PWM_OUT), and the first and second gate control signals Ctrl1 and Ctrl2 are retrieved from the memory to turn off the transistors Q1 and Q2.

The voltage detection circuit 205 continually monitors the output voltage $V_{OUT}$ and generates the three comparison results CS1, CS2, and CS3. And, when the second comparison result CS2 indicates the first error signal is larger than or equal to the $V_{pth}$, the state machine 210 may enter into a Tracking Clamp (TC) mode and retrieve a low PWM_OUT to turn on the switch LS and retrieve two gate control signals Ctrl1 and Ctrl2 to turn both Q1 and Q2 on to enable at least one of Q1 and Q2 work in saturation mode. If the second comparison result CS2 then indicates the first error signal (270) is less than the $V_{pth}$, then, the state machine 210 may be set to the default bypass mode. Thus, an overshoot event may be fast responded.

When the unloading energy is supposed to be saved rather than dissipation, and when the second comparison result CS2 indicates the first error signal is larger than or equal to the $V_{pth}$, the state machine 210 may work in a Hi-z (high impedance) mode and retrieve configurations from the memory to turn off the HS, and generate gate control signals Ctrl1 and Ctrl2 to enable both the transistors Q1 and Q2 work as resistor (e.g., transistors Q1 and Q2 work in ohmic region or triode region). In some embodiments, the energy amount dissipated by the transistors Q1 and Q2 may be controlled by controlling the gate control signals Ctrl1 and Ctrl2 or making the transistors Q1 and Q2 work in saturation mode. Thus, the amount of circulating charge $I_B$ or the impedance of the bypass circuit are controlled, Accordingly, the amount of power dissipation on the bypass circuit 160 may be controlled based on the load transient. Therefore, the timing and/or quantity of energy transfer from the inductor to a load may be controlled. In some embodiments, the state machine may enter into the Hiz mode from a controlling signal generated by, for example, the controller 150. In some embodiments, if the first error signal gets bigger again, the state machine may be configured to enter into the Tracking Clamp (TC) mode. In some embodiments, the Hiz mode may be a replacement for the Tracking Clamp (TC) mode, in some embodiments, the TC mode may be a replacement for the Hiz mode, and the state machine may be configured to work in four different modes.

When the third comparison result CS3 indicates the first error signal is less than or equal to the $V_{nth}$, and PWM_IN is high, then, the state machine 210 may triggered to work in a Charge Boost (CB) mode and retrieve configurations (e.g., high PWM_OUT, corresponding Ctrl1, Ctrl2) from the memory to turn off LS, turn on the HS, and also turn on the Q1 and Q2. Thus, an undershoot event may be fast responded. The bypass circuit may be active if Q2 is turned on and the body diode of Q1 conducts, or both Q1 and Q2 are turned on. To limit the current flowing through the bypass circuit, Q1 and Q2 may be configured to work in different modes. For example, in some embodiments, both Q1 and Q2 may work in saturation mode. In some embodiments, Q2 may work in saturation mode and Q1 may be turned off (e.g., body diode conducts). In some embodiments, resistors may be added in the bypass circuit, and Q1 and Q2 may work in triode or saturation mode. In some embodiments, when the resistors are added in the bypass circuit, Q2 may be turned on, and Q1 may be turned off with body diode conduct. In some embodiments, a counter may be used and a frequency deviation $\Delta f_{sw}$ between an ideal PWM signal and a real PWM signal may be calculated in variable frequency systems. If the frequency deviation $\Delta f_{sw}$ is larger or equal to a predetermined frequency deviation $\Delta f_{sw\_th}$, then the state machine 210 may also be triggered to work in the Charge Boost (CB) mode. The $\Delta f_{sw}$ calculation may also be used for variable frequency control approaches When the first comparison result CS1 indicates the first processed signal 255 is larger than or equal to the limit voltage $V_{limit}$, the state machine 210 may enter into an Instant Clamp mode and retrieve configurations (e.g., low PWM_OUT, corresponding Ctrl1, Ctrl2) from the memory to turn off the high-side switch HS, turn on the low-side switch LS, the two transistors Q1 and Q2. To limit the current flowing through the bypass circuit, Q1 and Q2 may be configured to work in different modes. For example, in some embodiments, Q1 may work in saturation mode and Q2 may be turned off. In some embodiments, both Q1 and Q2 may work in saturation mode. In some embodiments, resistors may be used to increase the impedance of the bypass circuit. In all modes, including TC, HiZ and CB, whenever the CS1 indicates the first processed signal 255 is larger than or equal to the limit voltage $V_{limit}$, the state machine 210 may enter into the Instant Clamp mode immediately. Thus, energy at the output node that is applying to the loads 115 may be clamped to protect the loads.

Figure 3:
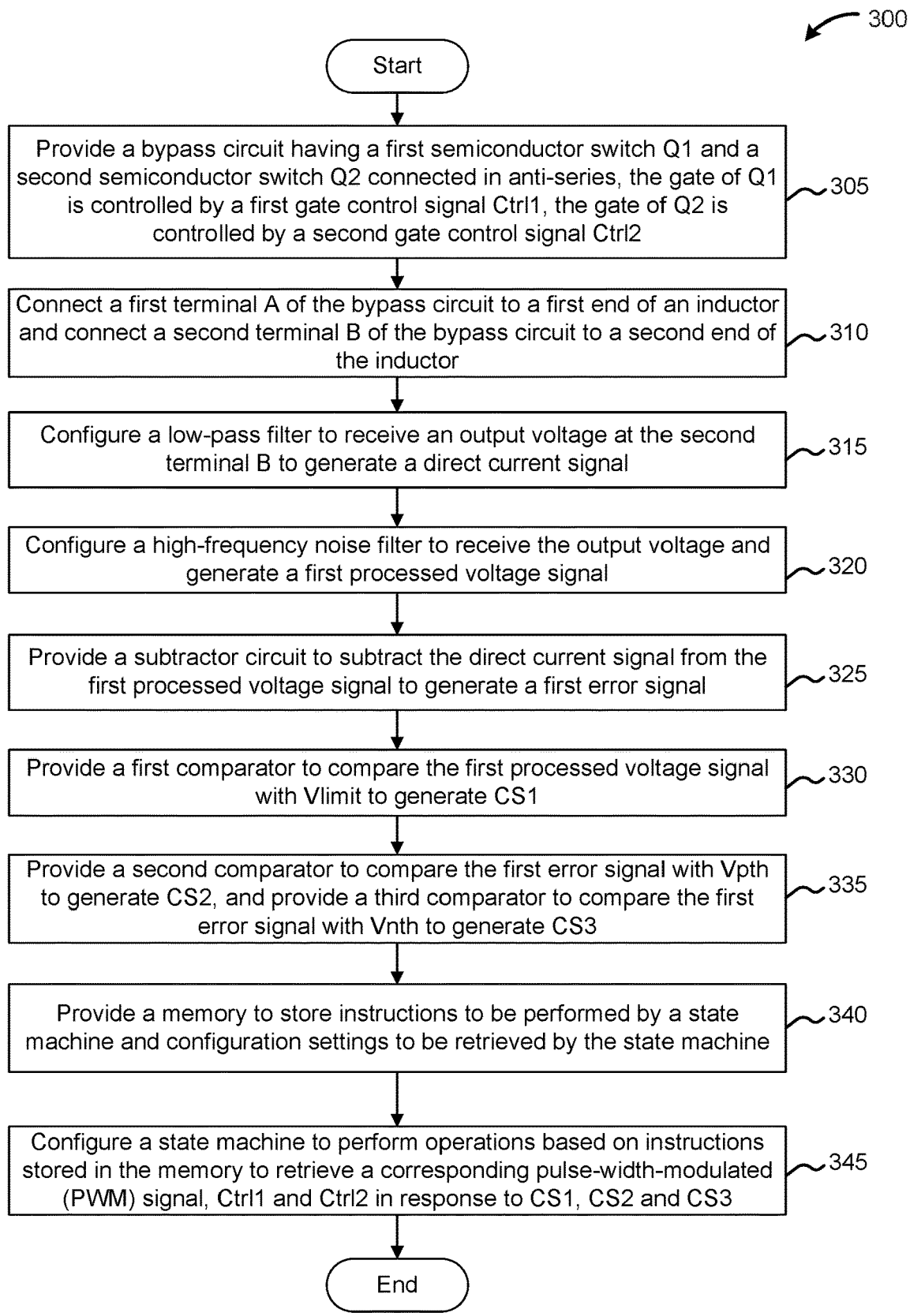
FIG. 3 depicts a flow chart of an exemplary method to implement the IEM IC.

FIG. 3 depicts a flow chart of an exemplary method to implement the IEM IC. An exemplary method 300 to implement the IEM IC 155 includes, at 305, providing a bypass circuit (e.g., the bypass circuit 160) having a first semiconductor switch (e.g., Q1) and a second semiconductor switch (e.g., Q2) connected in anti-series, the gate of Q1 is controlled by a first gate control signal Ctrl1, the gate of Q2 is controlled by a second gate control signal Ctrl2. The method 300 also includes, at 310, connecting a first terminal (e.g., node A) of the bypass circuit 160 to a first end of an inductor (e.g., inductor 135) and connecting a second terminal (e.g., output node B) of the bypass circuit 160 to a second end of the inductor 135.

The method 300 also includes, at 315, configuring a low-pass filter (e.g., LPF 240) to receive an output voltage $V_{OUT}$ at the second terminal B to generate a direct current signal (e.g., the DC signal 245). The method 300 also includes, at 320, configuring a high-frequency noise filter (e.g., the filter 250) to receive the output voltage $V_{OUT}$ and generate a first processed voltage signal (e.g., the first processed voltage signal 255). The method 300 also includes, at 325, providing a subtractor circuit (e.g., the subtractor circuit 265) to subtract the direct current signal 245 from the first processed voltage signal 255 to generate a first error signal (e.g., the first error signal 270).

The method 300 also includes, at 330, providing a first comparator (e.g., the first comparator 260) to compare the first processed voltage signal 255 with a predetermined limit voltage $V_{limit}$ to generate a first comparison result CS1. The method 300 also includes, at 335, providing a second comparator (e.g., the second comparator 285a) to compare the first error signal 270 with a predetermined positive threshold $V_{pth}$ to generate a second comparison result CS2, and providing a third comparator to compare the first error signal 270 with a predetermined negative threshold $V_{nth}$ to generate a third comparison result CS3.

The method 300 also includes, at 340, Providing a memory (e.g., the memory 220) to store instructions to be performed by a state machine (e.g., the state machine 210) and configuration settings to be retrieved by the state machine 210. The method 300 also includes, at 345, configuring a state machine (e.g., the state machine 210) to perform operations based on instructions stored in the memory 220 to retrieve a corresponding pulse-width-modulated (PWM) signal, Ctrl1 and Ctrl2 in response to the generated comparison results CS1, CS2 and CS3. The operations performed by the state machine 210 are described in detail with reference to FIG. 2B. By providing the IEM IC 155, output voltage of the voltage regulator 120 may be dynamically monitored, and a load transient response performance of the voltage regulator 120 may be advantageously improved.

Figure 4:
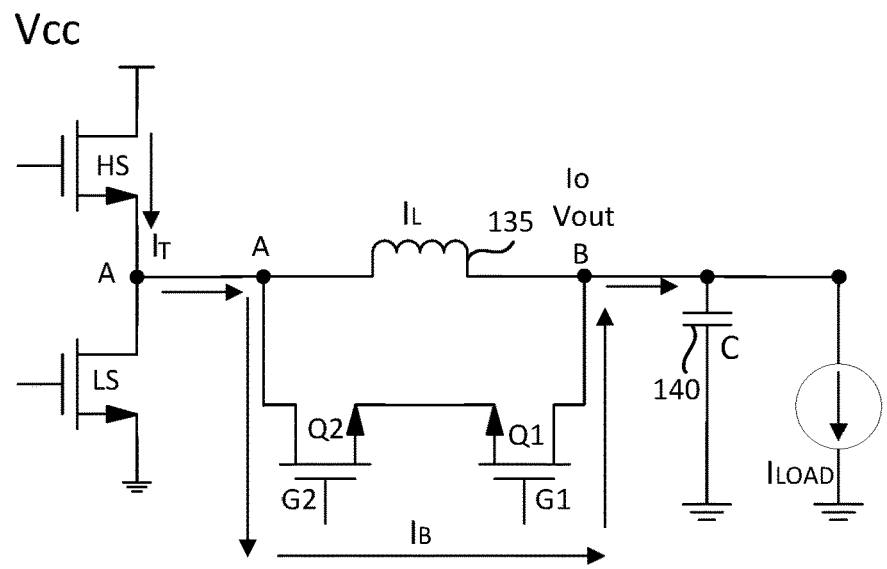
FIG. 4 depicts an architecture of an exemplary switch-mode power supply and IEM IC working in a charge boost mode, and timing diagrams of output voltage $V_{OUT}$ and output current $I_O$.
Figure 4:
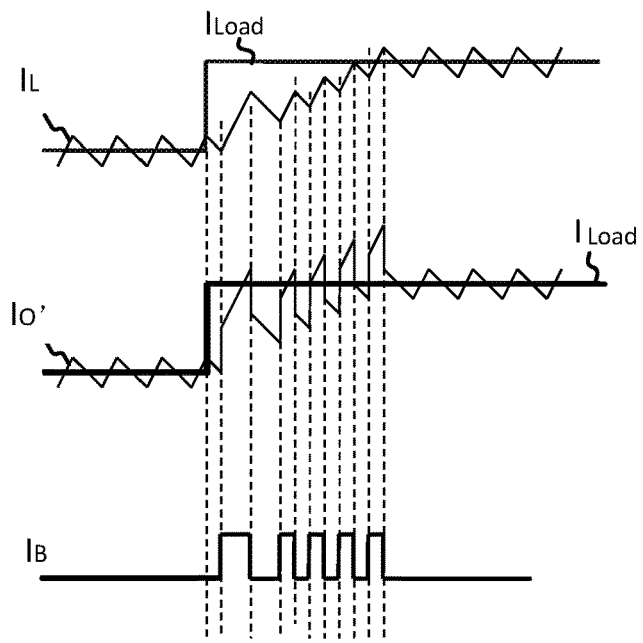
Figure 4:
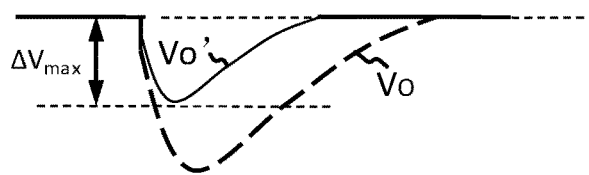

FIG. 4 depicts an architecture of an exemplary switch-mode power supply and IEM IC working in a charge boost mode, and timing diagrams of output voltage $V_{OUT}$ and output current $I_O$. First, the timing diagram of the inductor current $I_L$ is shown when there is a step-up load transient. Timing diagram of the corresponding output voltage $V_O$ at node B is also shown. In this depicted example, in response to an undershoot event, the state machine 210 retrieves configurations from the memory 220 to turn on the high-side switch HS, and also turn on the Q1 and Q2. Thus, an extra current (e.g., $I_B$) is supplied to the output node B quickly through the bypass circuit 160. To limit the current flowing through the bypass circuit, Q1 and Q2 may be configured to work in different modes. For example, in some embodiments, both Q1 and Q2 may work in saturation mode. In some embodiments, Q2 may work in saturation mode and Q1 may be turned off (e.g., body diode conducts). In some embodiments, resistors may be added in the bypass circuit, and Q1 and Q2 may work in triode or saturation mode. In some embodiments, when the resistors are added in the bypass circuit, Q2 may be turned on, and Q1 may be turned off with body diode conduct. Timing diagrams of the extra current ($I_B$) and the charge boosted output current $I_O'$ are shown. A corresponding timing diagram of the charge boosted output voltage $V_O'$ is also shown. By applying different gate control signals to the gate of the transistor Q2, different Vgs voltages (e.g., the voltage difference between the gate and the source of the Q2) may be obtained, which may enable difference current values flow through the transistor Q2. In some embodiments, the transistor Q1 may be configured such that the body diode of the transistor Q1 may limit inrush current. In some embodiments, a resistor (e.g., with a resistance of 60 mΩ) may be arranged between the output node B and the transistor Q1 to limit the maximum current to, for example, 30A.

Figure 5A:
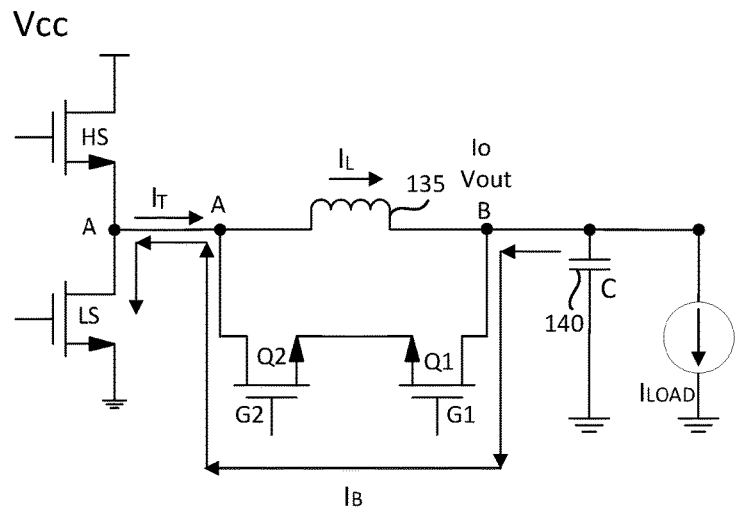
FIG. 5A depicts an architecture of an exemplary switch-mode power supply and IEM IC working in an instant clamp mode, and timing diagrams of load current $I_L$, output current $I_O$, bypass current $I_B$, output voltage $V_{OUT}$, gate control signals, and PWM_OUT signal.
Figure 5A:
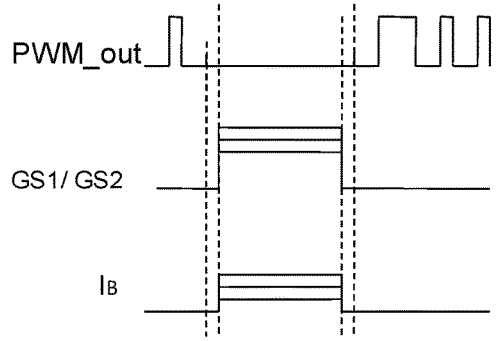
Figure 5A:
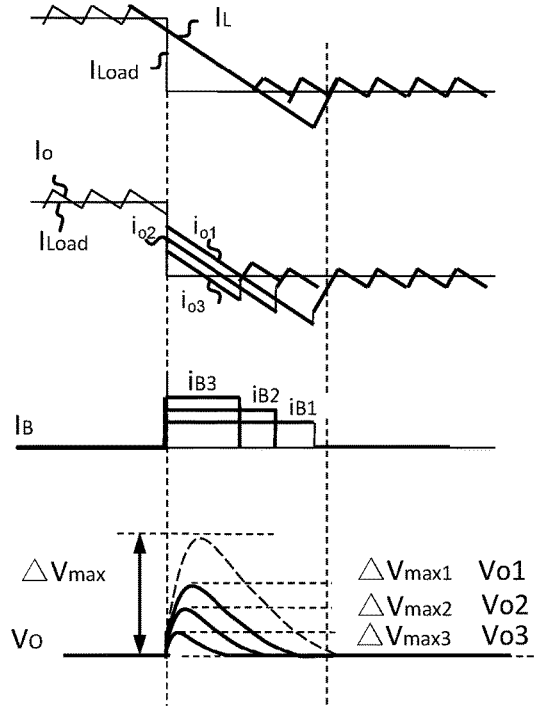

FIG. 5A depicts an architecture of an exemplary switch-mode power supply and IEM IC working in an instant clamp mode, and timing diagrams of load current $I_L$, output current $I_O$, bypass current $I_B$, output voltage $V_{OUT}$, gate control signals, and PWM_OUT signal. In this depicted example, as a peak voltage of the output voltage is larger than or equal to the predetermined limit voltage $V_{limit}$ to be applied to the loads 115, the state machine 210 enters into the Instant Clamp mode, the high-side switch HS is turned off to stop power supplying from $V_{CC}$. The low-side switch LS, the transistors Q1 and Q2 are turned on. To limit the current flowing through the bypass circuit, Q1 and Q2 may be configured to work in different modes. For example, in some embodiments, Q1 may work in saturation mode and Q2 may be turned off. In some embodiments, both Q1 and Q2 may work in saturation mode. In some embodiments, resistors may be used to increase the impedance of the bypass circuit. One of the two transistors Q1 and Q2 work in saturation mode. By changing the gate voltage applied to the transistor that works in saturation mode, the current (e.g., clamping current) flowing through the bypass circuit 160 may be limited. For example, the transistor Q1 may work in saturation mode, and the body diode of the transistor Q2 may conduct, which may limit the clamping current to, for example, about 30 A. In some embodiments, the transistor Q2 may be set to work in saturation mode. In some embodiments, a resistor may be arranged between the output node B and the transistor Q1 to limit the clamping current to a level that is in acceptable range for all the transistors.

Timing diagrams of the load current $I_L$, output current $I_O$, bypass current (e.g., clamping current) $I_B$, output voltage $V_{OUT}$, gate control signals, and PWM_OUT signal are shown. In response to a step down transient, and when the output voltage is no less than the predetermined limit voltage $V_{limit}$, the transistors Q1 and Q2 are turned on, and different gate control signals (thus, different $V_{GS}$ voltages) may be applied to the transistors Q1 and Q2 to generate a bypass current $I_B$ with different amplitudes. When the gate control signals are set in different levels, the bypass current may be set accordingly, and the output voltage $V_{OUT}$ at the output node B may be then controlled.

Figure 5B:
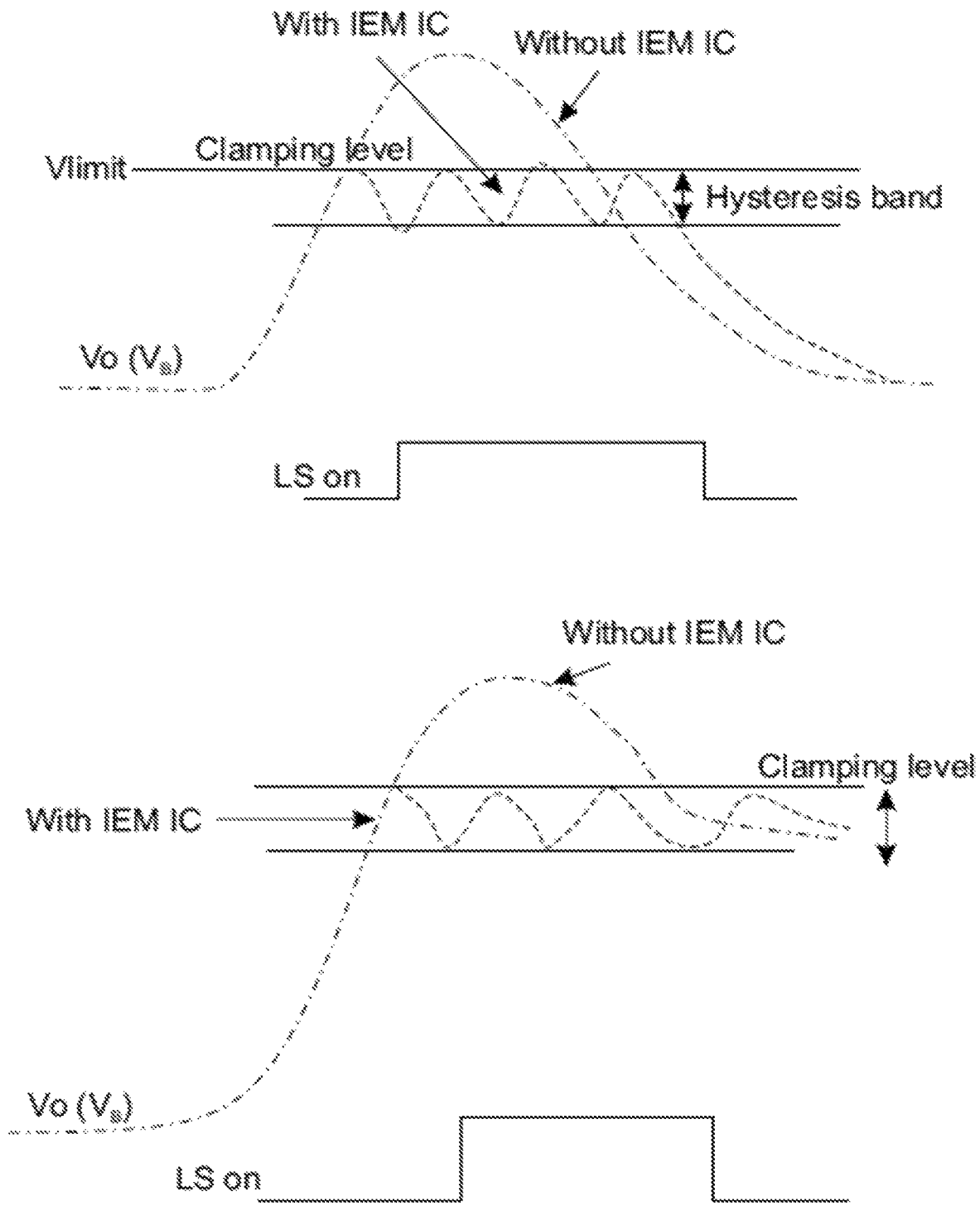
FIG. 5B depicts timing diagrams of output voltage $V_{OUT}$ when a smaller hysteresis band is implemented to control the discharging of the output voltage $V_{OUT}$.

FIG. 5B depicts timing diagrams of output voltage $V_{OUT}$ when a smaller hysteresis band is implemented to control the discharging $V_{OUT}$. When the low-side transistor LS is turned on (when the PWM_OUT signal is low) and the peak value of the output voltage $V_{OUT}$ is no less than the predetermined limit voltage $V_{limit}$, a hysteresis band (e.g., 20 mV) may be implemented to avoid chattering. The top figure is the simulation result for no load line cases where the reference voltage remains constant. The bottom figure is the simulation result for the case that load line is used and the target voltage moves based on the current, so it may settle at higher value when there is an unloading event.

Figure 5C:
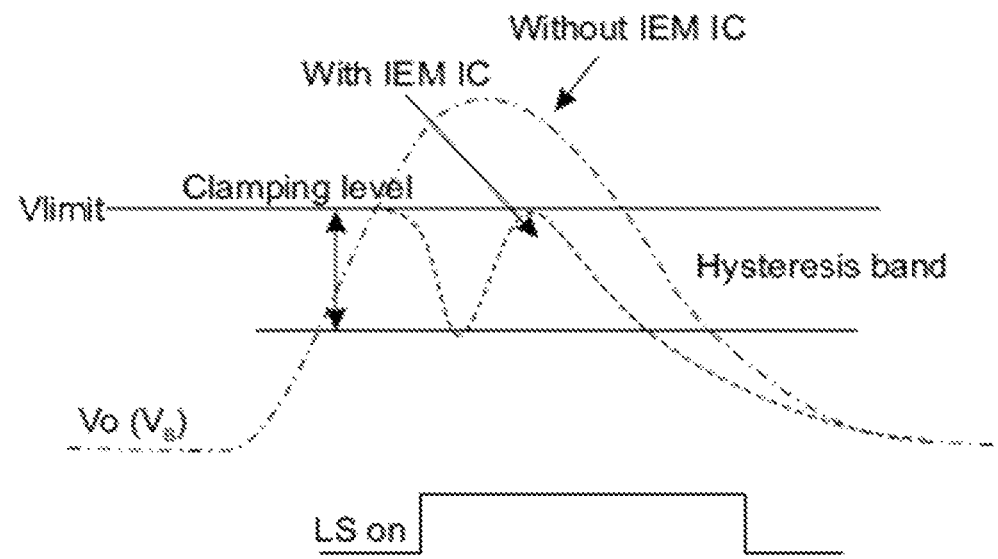
FIG. 5C depicts timing diagrams of output voltage $V_{OUT}$ when a larger hysteresis band is implemented to control the discharging of the output voltage $V_{OUT}$.
Figure 5C:
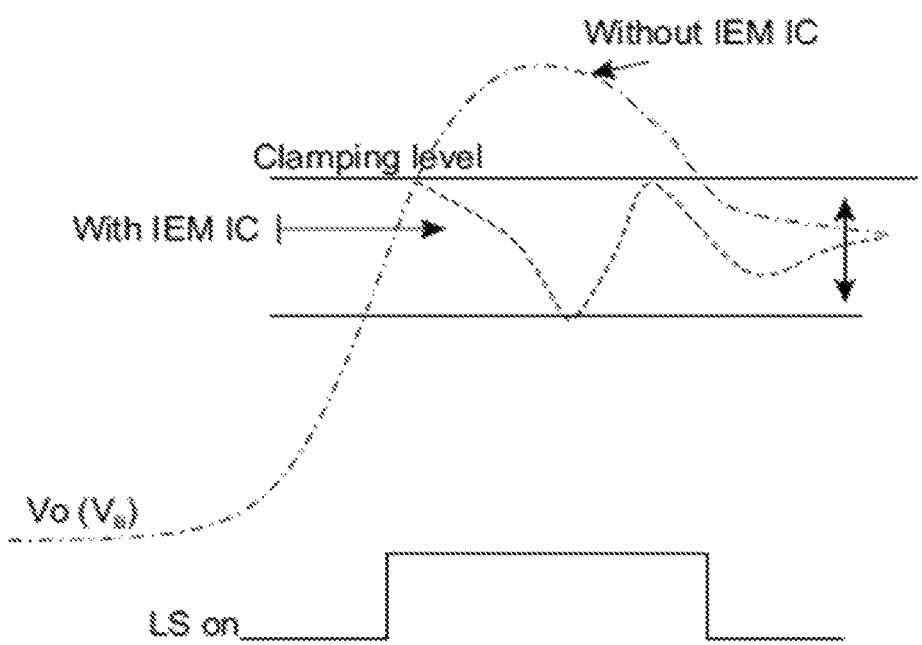

FIG. 5C depicts timing diagrams of output voltage $V_{OUT}$ when a larger hysteresis band is implemented to control the discharging $V_{OUT}$. The top figure is the simulation result for no load line cases where the reference voltage remains constant. The bottom figure is the simulation result for the case that load line is used and the target voltage moves based on the current, so it may settle at higher value when there is an unloading event.

Figure 6:
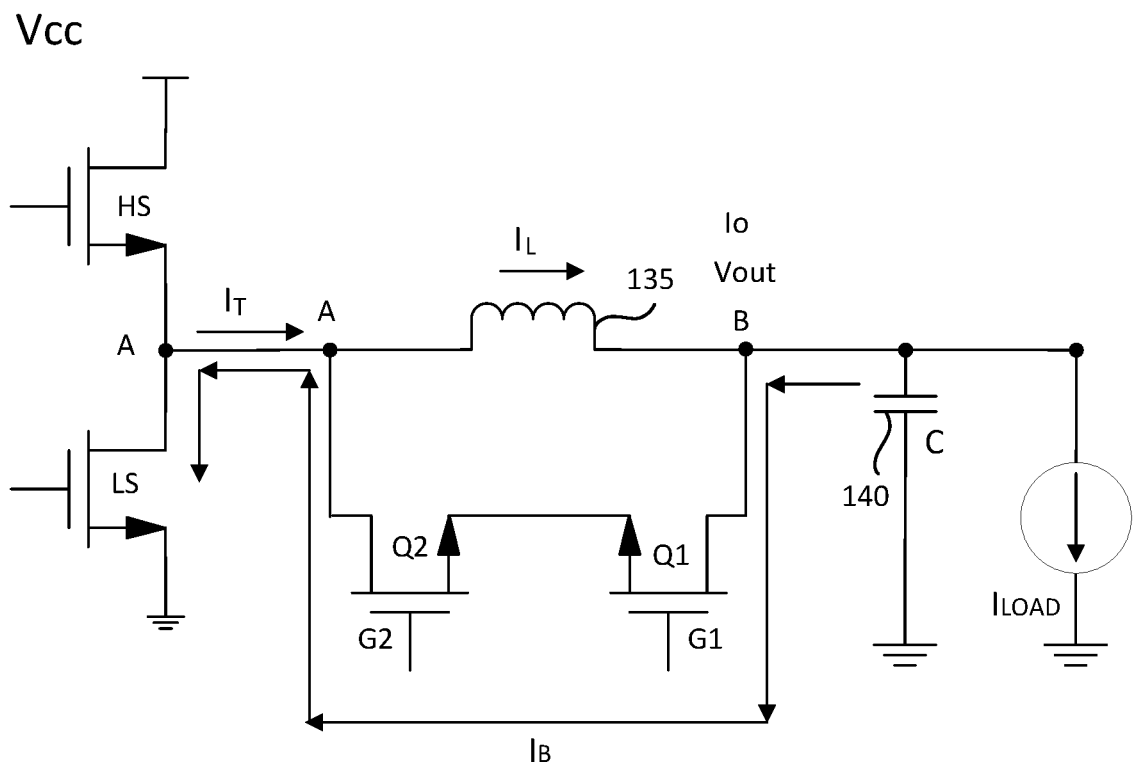
FIG. 6 depicts an architecture of an exemplary switch-mode power supply and IEM IC working in a tracking clamp mode, and timing diagrams of load current $I_L$ and output current $I_O$ when a load line is implemented.

FIG. 6 depicts an architecture of an exemplary switch-mode power supply and IEM IC working in a tracking clamp mode, and timing diagrams of load current $I_L$ and output current $I_O$ when a load line is implemented. In this depicted example, the output voltage is larger than or equal to the predetermined positive threshold voltage $V_{pth}$, the state machine 210 enters into the Tracking Clamp mode, the high-side switch HS is turned off to stop power supplying from $V_{CC}$, the low-side switch LS, the transistors Q1 and Q2 are turned on for a predetermined period of time. In some embodiments, both two transistors Q1 and Q2 work in saturation mode. In some embodiments, the transistor Q1 may be set to work in saturation mode and the transistor Q2's body diode may limit the clamping current to, for example, 30A. In some embodiments, a resistor (e.g., with a resistance of 60 mΩ) may be arranged between the output node B and the transistor Q1 to limit the clamping current.

As discussed with reference to FIG. 2A, the voltage detection circuit 205 may include a load line. When a load line is added, $V_{droop}$ offset indicating the reference voltage movement may be estimated by measuring or estimating the change of the inductor current.

Figure 7A:
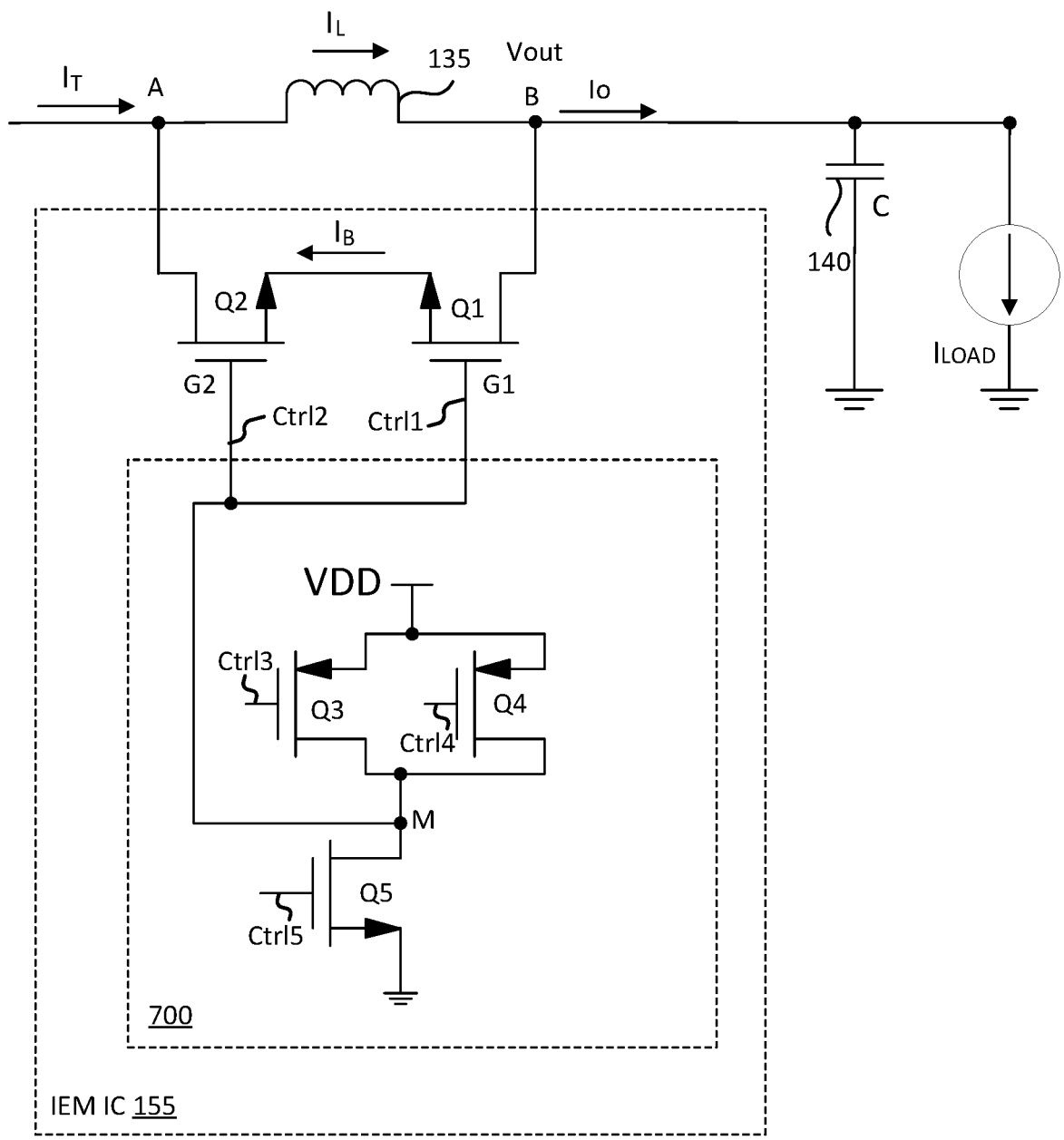
FIG. 7A depicts an architecture of an exemplary gate control circuit implemented in the IEM logic.

FIG. 7A depicts an architecture of an exemplary gate control circuit implemented in the IEM logic. As discussed with reference to FIG. 2A, the first and second gate control signals Ctrl1 and Ctrl2 are generated by the state machine 210. In some embodiments, hardware circuits may be used to generate the control signals and/or the PWM_OUT signal. In this depicted example, the gates of both the transistor Q1 and the transistor Q2 are controlled by a same signal $V_V$.

In this depicted example, a gate control circuit 700 is used to generate the first and second gate control signals Ctrl1 and Ctrl2. The gate control circuit 700 includes a third transistor Q3, a fourth transistor Q4, and a fifth transistor Q5. The transistors Q3 and Q4 are P-channel Metal-Oxide-Semiconductor Field Effect Transistors (PMOSFETs), and the transistor Q5 is a N-channel Metal-Oxide-Semiconductor Field Effect Transistor (NMOSFET). The sources of the transistors Q3 and Q4 are commonly coupled to receive a voltage supply $V_{DD}$, the drains of the transistors Q3 and Q4 are commonly coupled to a node M. The gate of the transistor Q3 is controlled by a third gate control signal Ctrl3, and the gate of the transistor Q4 is controlled by a fourth gate control signal Ctrl4. The drain of the transistor Q5 is coupled to the node M, and the gate of the transistor Q5 is controlled by a fifth gate control signal Ctrl5. The voltage signal $V_V$ at the node M is outputted as the first gate control signal Ctrl1 and the second gate control signal Ctrl2 to enable one of the transistors Q1 and Q2 work in saturation mode to reduce the output voltage $V_{OUT}$ at the node B. The gate control signals Ctrl3, Ctrl4 and Ctrl5 may be generated by other portions of gate control circuit 700 that is not shown or provided by other portions of IEM IC 155 that is not shown.

In this depicted example, the transistor Q3 is a weak pull-up device, the transistor Q4 is a strong pull-up device, and the transistor Q5 is a strong pull-down device. For example, the width of the transistor Q3 may be much smaller than the width of the transistor Q4. As a result, the on-state resistance of the transistor Q3 is much larger than the on-state resistance of the transistor Q4. The time constant of the transistor Q3 and the input capacitance of the bypass circuit 160 is much longer than the on time of the transistors Q1 and Q2 in the bypass circuit 160.

The gate control circuit 700 may advantageously reduce or substantially eliminate shoot-through between the pull-up devices and the pull down device. When the transistors Q1 and Q2 in the bypass circuit are turned on, the transistor Q3 may be kept on for the entire duration of the conduction period of the bypass circuit 160, and the transistor Q4 may be turned on for a portion of the entire duration to control the gate voltages of the transistors Q1 and Q2. More specifically, the transistor Q4 may be turned on simultaneously with the transistor Q3, and the transistor Q4 may be turned off before the transistor Q3 is turned off. Accordingly, a corresponding Vgs (gate-source voltage difference) of the transistor Q1/Q2 in the bypass circuit 160 may remain substantially constant when the transistor Q3 is turned on and the transistor Q4 is turned off. The longer time the transistor Q4 is kept on, the gates of the transistors Q1 and Q2 may be charged to a higher voltage, which then reduces the on-state resistances of the transistors Q1 and Q2. The duration of the simultaneous conduction of the weak pull-up device Q3 and the strong pull-up device Q4 may be chosen to achieve a given bypass current $I_B$ for specific bypass switches Q1, Q2, and output voltage $V_{OUT}$.

Figure 7B:
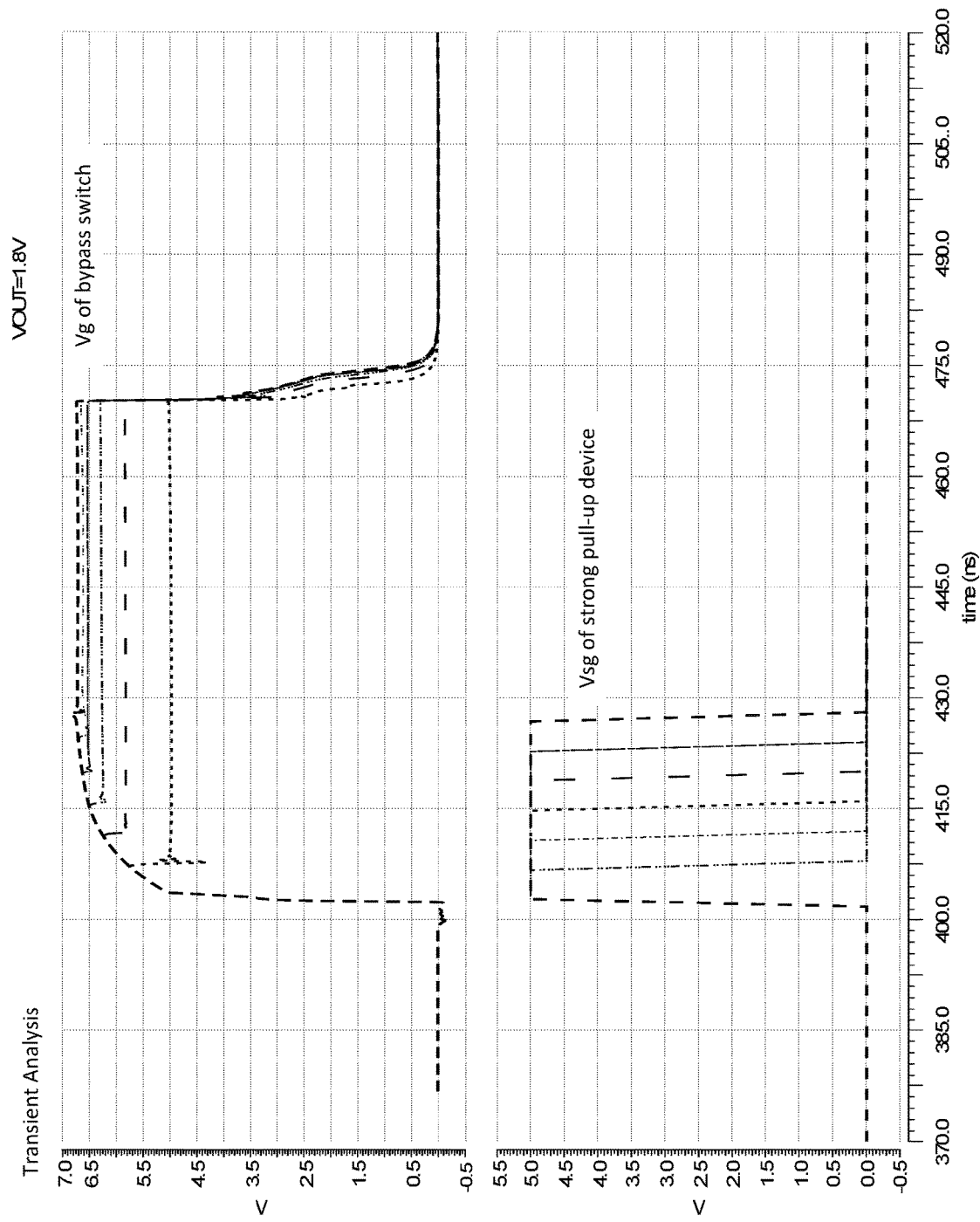
FIGS. 7B and 7C depict timing diagrams of gate-source signals applied to the gate control circuit and gate control signals generated by the gate control circuit.
Figure 7C:
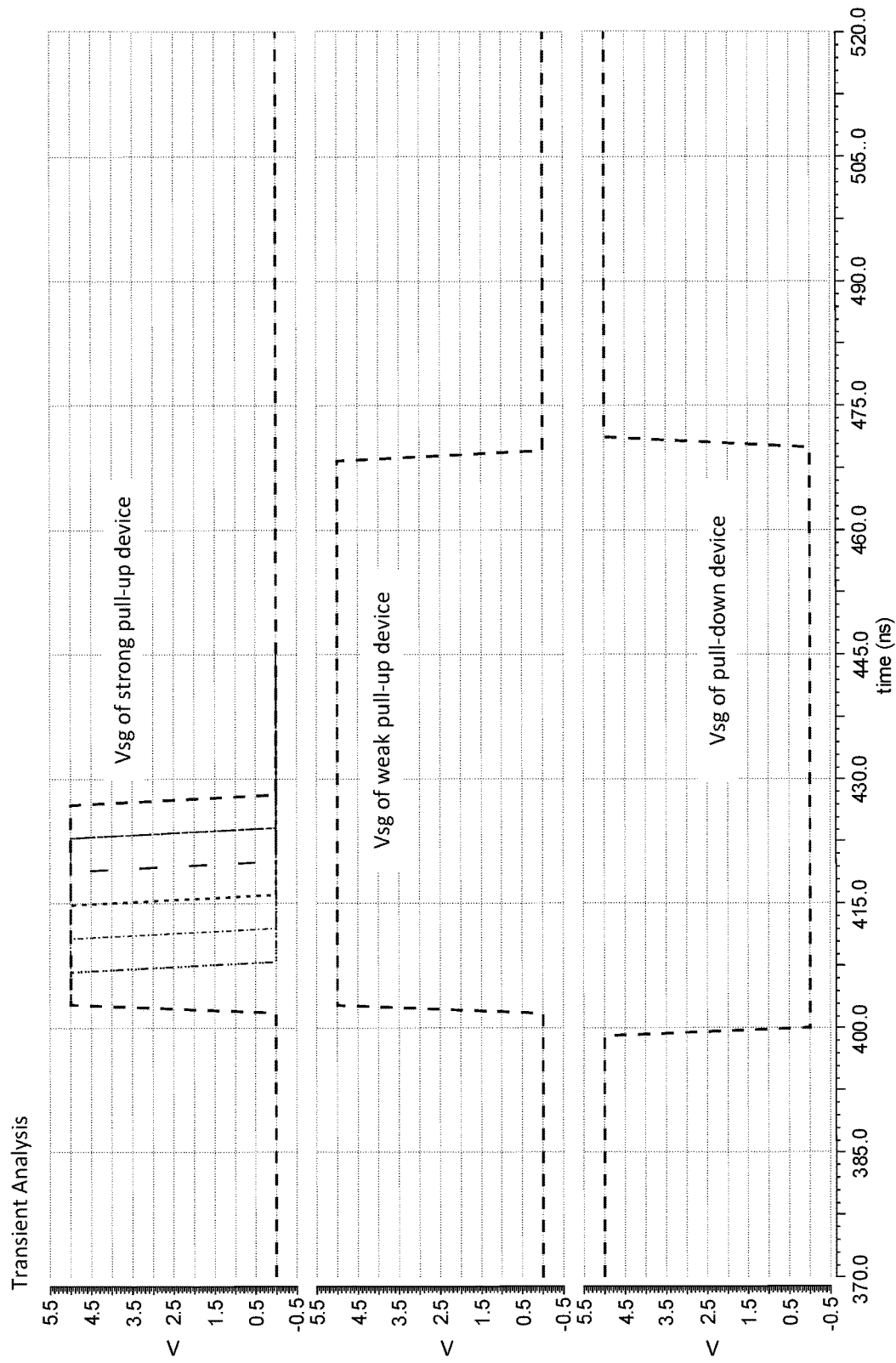

FIGS. 7B and 7C depict timing diagrams of gate-source signals applied to the gate control circuit and gate control signals generated by the gate control circuit. As shown in the simulation results, the gate-source voltage difference Vgs of the transistor Q5 and the source-gate voltage difference Vsg of the transistor Q3 may be controlled such that the transistors Q3 and Q5 may be kept on for the entire duration of the conduction period of the bypass circuit 160 (e.g., Vgs of the bypass switches), and the source-gate voltage difference Vsg of the transistor Q4 may be controlled such that the transistor Q4 may be turned on for a portion of the entire duration of the conduction period of the bypass circuit 160 to control the gate voltages of the transistors Q1 and Q2. By changing the duration of the simultaneous conduction of the weak pull-up device Q3 and the strong pull-up device Q4, the gate control signal $V_V$ applied to the bypass circuit may be changed.

In some embodiments, a voltage regulator may include multiple power stages driven by different PWM signals. Multiple IEM ICs may be used to control the operation of respective bypass circuits. An enable signal may be used to enable one or more of the multiple IEM ICs. A sync signal may be applied to the multiple IEM ICs to align the falling edges of the different PWM signals.

Although various embodiments have been described with reference to the figures, other embodiments are possible. Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

In one exemplary aspect, a system includes (a) a power stage. The power stage includes: (a1) a main switch operative to selectively connect a first terminal of an input voltage source to an intermediate switch node in response to a first pulse-width-modulated (PWM) signal, and, (a2) a freewheeling rectifier coupled to conduct current between a second terminal of the input voltage source and the intermediate switch node in response to the first PWM signal. The system also includes (b) an inductor having a first terminal coupled to the intermediate switch node and a second terminal coupled to an output node adapted to communicate energy to a load.

The system also includes (c) a bypass circuit having a first end electrically connected to the first terminal of the inductor and a second end electrically connected to the second terminal of the inductor, the bypass circuit includes a first semiconductor switch Q1 and a second semiconductor switch Q2 connected in anti-series, the gate of Q1 is controlled by a first gate control signal Ctrl1, the gate of Q2 is controlled by a second gate control signal Ctrl2. The system also includes (d) a logic circuit configured to generate the first PWM signal, the first gate control signal Ctrl1 and the second gate control signal Ctrl2 to enable the bypass circuit to cooperate in a plurality of predetermined modes defined by a state machine, the state machine is responsive to a second PWM signal and an output voltage signal at the output node, the plurality of predetermined modes include a clamping mode, the clamping mode provides a low impedance current path in parallel with the inductor.

In an illustrative embodiment, such as depicted at least with respect to FIGS. 1-2A, the first PWM signal may, by way of example and not limitation, include PWM_OUT. In some embodiments the second PWM signal may, by way of example and not limitation, include PWM_IN." In some embodiments, the output voltage signal may, by way of example and not limitation, include Vout.

In some embodiments, the logic circuit may include (e) a voltage detection circuit configured to receive the second PWM signal, the output voltage signal, a predetermined positive threshold voltage, a predetermined negative threshold voltage, and a predetermined limit voltage to generate three comparison results, (f) the state machine coupled to the voltage detection circuit to receive the three comparison results, and, (g) a memory coupled to the state machine and containing a program of instructions that, when executed by the state machine, cause the state machine to perform operations to generate the first PWM signal and the first and second gate control signals.

In some embodiments, the voltage detection circuit may include: (h) a first amplifier configured to amplify the output voltage signal, (i) a band pass filter configured to receive the amplified output voltage to generate a first error signal and a first processed voltage signal, (j) a first comparator configured to compare the first processed voltage signal with the predetermined limit voltage $V_{limit}$ to generate a first comparison result CS1, (k) a second comparator configured to compare the first error signal with the predetermined positive threshold voltage $V_{pth}$ to generate a second comparison result CS2, and, (h) a third comparator configured to compare the first error signal with the predetermined negative threshold voltage $V_{nth}$ to generate a third comparison result CS3.

In some embodiments, the operations of the state machine may include (i) determining the value of CS1, and, (ii) if CS1 indicates the first processed voltage signal is no less than the $V_{limit}$, then, retrieving configurations from the memory to force the first PWM signal to low, generate Ctrl1 and Ctrl2 to turn both Q1 and Q2 on, and make both Q1 and Q2 work in saturation mode. In some embodiments, the operations of the state machine may include (i) determining the values of CS2, (ii) if CS2 indicates the first error signal is no less than the $V_{pth}$, then, retrieving configurations from the memory to force the first PWM signal to low and generate Ctrl1 and Ctrl2 to turn both Q1 and Q2 on and enable both Q1 and Q2 work in saturation mode to dissipate unloading energy, and, (iii) if CS2 indicates the first error signal is less than the $V_{pth}$, then, retrieving configurations from the memory to output the second PWM signal as the first PWM signal and generate Ctrl1 and Ctrl2 to turn off both Q1 and Q2.

In some embodiments, the operations of the state machine may include: (i) determining the values of CS2, and, (ii) if CS2 indicates the first error signal is no less than the $V_{pth}$, then, retrieving configurations from the memory to turn off the main switch, turn on the freewheeling rectifier, and generate Ctrl1 and Ctrl2 to enable both Q1 and Q2 work in ohmic mode to cause a part of an inductor current circulate through the bypass circuit to save unloading energy. In some embodiments, the operations of the state machine may include: (i) determining the values of CS3, (ii) if CS3 indicates the first error signal is less than $V_{nth}$, and the first PWM signal is high, then, retrieving configurations from the memory to generate Ctrl1 and Ctrl2 to turn on both Q1 and Q2, and, (iii) if CS3 indicates the first error signal is no less than $V_{nth}$, then, retrieving configurations from the memory to output the second PWM signal as the first PWM signal and generate a corresponding bypass control signal to turn off Q1 and Q2.

In some embodiments, the band pass filter may include a low-pass filter configured to receive the amplified output voltage to generate a direct current signal, a high-frequency noise filter configured to receive the amplified output voltage to generate the first processed voltage signal, and, a summing circuit configured to subtract the direct current signal from the first processed voltage signal to generate the first error signal. In some embodiments, the voltage detection circuit may include a second amplifier configured to amplify the first error signal when the absolute value of first error signal is larger than the absolute value of a predetermined error threshold value, the gain of the second amplifier may be 1. In some embodiments, the state machine may be configured to work in a corresponding mode in response to a pin signal generated by a controller.

In some embodiments, the logic circuit may include a gate control circuit configured to generate the first and second gate control signals Ctrl1 and Ctrl2, the gate control circuit may include a third transistor Q3, a fourth transistor Q4, and a fifth transistor Q5, sources of the transistors Q3 and Q4 may be commonly coupled to receive a voltage supply $V_{DD}$, drains of the transistors Q3 and Q4 may be commonly coupled to a node M, a drain of the transistor Q5 is coupled to the node M, a voltage signal $V_V$ at the node M is outputted as the first gate control signal Ctrl1 and the second gate control signal Ctrl2.

In some embodiments, the transistors Q3 and Q4 may include PMOSFETs, and the transistor Q5 may be an NMOSFET. In some embodiments, the transistor Q3 may be a week pull-up device with high on-resistance and the transistor Q4 may be a strong pull-up device with low on-resistance, the transistor Q5 may be a strong pull-down device. In some embodiments, in operation, the transistors Q3 being turn on for an entire duration of a conduction period of the bypass circuit, and the transistor Q4 being turned on for a portion of the entire duration the conduction period of the bypass circuit. In some embodiments, the system may also include a housing enclosing the bypass circuit and the logic circuit.

In another exemplary aspect, a control circuit for controlling a switch-mode voltage regulator including a high side switch connected between an input terminal and an intermediate switch node, a freewheeling rectification device connected between the intermediate switch node and ground, an inductor and a bypass circuit connected in parallel between the intermediate switch node and an output terminal, the bypass circuit includes a first transistor Q1 and a second transistor Q2. The control circuit includes, a third transistor Q3, a fourth transistor Q4, and, a fifth transistor Q5. Sources of the third and fourth transistors Q3 and Q4 may be commonly coupled to receive a voltage supply $V_{DD}$, drains of the third and fourth transistors Q3 and Q4 may be commonly coupled to a node M, a drain of the fifth transistor Q5 is coupled to the node M, a voltage signal $V_V$ at the node M is outputted as a gate control signal for controlling gates of the first and second transistors Q1 and Q2.

In an illustrative embodiment, such as depicted at least with respect to FIG. 6, an input terminal may, by way of example and not limitation, include Vcc. In some embodiments an intermediate switch node may, by way of example and not limitation, include node "A." In some embodiments a freewheeling rectification device connected between the intermediate switch node and ground may, by way of example and not limitation, include low-side switch "LS."

In some embodiments, the third and fourth transistors Q3 and Q4 may include PMOSFETs, and the fifth transistor Q5 may include an NMOSFET. In some embodiments, the third transistor Q3 may include a week pull-up device with high on-resistance and the fourth transistor Q4 may include a strong pull-up device with low on-resistance, the fifth transistor Q5 may include a strong pull-down device. In some embodiments, when in operation, the third transistor Q3 being turn on for an entire duration of a conduction period of the bypass circuit, and the fourth transistor Q4 being turned on for a portion of the entire duration the conduction period of the bypass circuit. In some embodiments, the third and fourth transistors Q3 and Q4 being turn on at the same time and the fourth transistor Q4 being turn off before the third Q3 being turn off.

In another exemplary aspect, an integrated circuit package includes (a) a housing, (b) a bypass circuit arranged in the housing and configured to have a first terminal electrically connected to a first end of an inductor through a first node and a second terminal electrically connected to a second end of the inductor through a second node, the bypass circuit includes a first semiconductor switch Q1 and a second semiconductor switch Q2 connected in anti-series, the gate of Q1 is controlled by a first gate control signal Ctrl1, the gate of Q2 is controlled by a second gate control signal Ctrl2. The integrated circuit package also includes (c) a logic circuit arranged in the housing and configured to generate a first pulse-width-modulated (PWM) signal, the first gate control signal Ctrl1, and the second gate control signal Ctrl2 to enable the bypass circuit to cooperate in a plurality of predetermined modes defined by a state machine, the state machine is responsive to a second PWM signal and an output voltage signal at the second node, the plurality of predetermined modes include a charge boost mode, the charge boost mode provides a low impedance current path in parallel with the inductor.

In some embodiments, the logic circuit may include (a) a voltage detection circuit configured to receive the second PWM signal, the output voltage signal, a predetermined positive threshold voltage, a predetermined negative threshold voltage, and a predetermined limit voltage ($V_{limit}$) to generate three comparison results CS1, CS2, and CS3, (b) a state machine coupled to the voltage detection circuit to receive the three comparison results, and, (c) a memory coupled to the state machine and containing a program of instructions that, when executed by the state machine, cause the state machine to perform operations to enable the power stage and the bypass circuit work in the plurality of predetermined modes.

In some embodiments, the voltage detection circuit may include (a) a band pass filter configured to receive the output voltage to generate a first error signal and a first processed voltage signal, (b) a first comparator configured to compare the first processed voltage signal with the predetermined limit voltage $V_{limit}$ to generate a first comparison result CS1, (c) a second comparator configured to compare the first error signal with the predetermined positive threshold voltage $V_{pth}$ to generate a second comparison result CS2, and, (d) a third comparator configured to compare the first error signal with the predetermined negative threshold voltage $V_{pth}$ to generate a third comparison result CS3.

In some embodiments, the operations may include (i) determining the value of CS1 and CS2, (ii) if CS1 indicates the first processed voltage signal is no less than the $V_{limit}$, then, retrieving configurations from the memory to force the first PWM signal to low, generate Ctrl1 and Ctrl2 to turn both Q1 and Q2 on, and make both Q1 and Q2 work in saturation mode, (iii) if CS2 indicates the first error signal is no less than the $V_{pth}$, then, retrieving configurations from the memory to force the first PWM signal to low and generate Ctrl1 and Ctrl2 to turn both Q1 and Q2 on and enable at least one of Q1 and Q2 work in saturation mode, and, (iv) if CS2 indicates the first error signal is less than the $V_{pth}$, then, retrieving configurations from the memory to output the second PWM signal as the first PWM signal and generate Ctrl1 and Ctrl2 to turn off both Q1 and Q2.

In some embodiments, the operations may include (i) determining the values of CS3, (ii) if CS3 indicates the first error signal is less than $V_{nth}$, and the first PWM signal is high, then, retrieving configurations from the memory to generate Ctrl1 and Ctrl2 to turn on both Q1 and Q2, and, (iii) if CS3 indicates the first error signal is no less than $V_{nth}$, then, retrieving configurations from the memory to output the second PWM signal as the first PWM signal and generate a corresponding bypass control signal to turn off both Q1 and Q2.

In another exemplary aspect, a method includes (a) providing a bypass circuit having a first terminal electrically connected to a first end (A) of an inductor through a first node and a second terminal electrically connected to a second end of the inductor through a second node, the bypass circuit includes a first semiconductor switch Q1 and a second semiconductor switch Q2 connected in anti-series, the gate of Q1 is controlled by a first gate control signal Ctrl1, the gate of Q2 is controlled by a second gate control signal Ctrl2. The method also includes (b) configuring a logic circuit to generate a first pulse-width-modulated (PWM) signal, Ctrl1, and Ctrl2 to enable the bypass circuit to cooperate in a plurality of predetermined modes defined by a state machine, the state machine is responsive to a second PWM signal (PWM_IN) and an output voltage signal ($V_{OUT}$) at the second node. The plurality of predetermined modes include a clamping mode, the clamping mode provides a low impedance current path in parallel with the inductor.

In some embodiments, the generation may include (a) configuring a low-pass filter to receive the output voltage and generate a direct current signal, (b) configuring a high-frequency noise filter to receive the output voltage and generate a first processed voltage signal, (c) subtracting the direct current signal from the first processed voltage signal to generate a first error signal, (d) comparing the first processed voltage signal with a predetermined limit voltage $V_{limit}$ to generate a first comparison result CS1, (e) comparing the first error signal with a predetermined positive threshold voltage $V_{pth}$ to generate a second comparison result CS2, (f) comparing the first error signal with a predetermined negative threshold voltage $V_{nth}$ to generate a third comparison result CS3, and, (g) configuring the state machine to perform operations to generate the first PWM signal, Ctrl1 and Ctrl2 in response to the three comparison results.

In some embodiments, the operations may include (i) determining the value of CS1, and (ii) if CS1 indicates the first processed voltage signal is no less than the $V_{limit}$, then, retrieving configurations from the memory to force the first PWM signal to low, generate Ctrl1 and Ctrl2 to turn both Q1 and Q2 on, and make both Q1 and Q2 work in saturation mode. In some embodiments, the operations may include (i) determining the value of CS2, (ii) if CS2 indicates the first error signal is no less than the $V_{pth}$, then, retrieving configurations from the memory to force the first PWM signal to low and generate Ctrl1 and Ctrl2 to turn both Q1 and Q2 on and enable both Q1 and Q2 work in saturation mode, and, (iii) if CS2 indicates the first error signal is less than the $V_{pth}$, then, retrieving configurations from the memory to output the second PWM signal as the first PWM signal and generate Ctrl1 and Ctrl2 to turn off both Q1 and Q2. In some embodiments, the operations may include (i) determining the values of CS3, (ii) if CS3 indicates the first error signal is less than $V_{nth}$ and the first PWM signal is high, then, retrieving configurations from the memory to generate Ctrl1 and Ctrl2 to turn on both Q1 and Q2, and, (iii) if CS3 indicates the first error signal is no less than $V_{nth}$, then, retrieving configurations from the memory to output the second PWM signal as the first PWM signal and generate a corresponding bypass control signal to turn off Q1 and Q2.

In an illustrative example, the switch of FIG. 1 labeled "LS" may, by way of example and not limitation, be implemented as a freewheeling rectifier.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A system, comprising:
    a power stage, comprising:
        a main switch operative to selectively connect a first terminal of an input voltage source to an intermediate switch node in response to a first pulse-width-modulated (PWM) signal; and,
        a freewheeling rectifier coupled to conduct current between a second terminal of the input voltage source and the intermediate switch node in response to the first PWM signal;
    an inductor having a first terminal coupled to the intermediate switch node and a second terminal coupled to an output node adapted to communicate energy to a load;
    a bypass circuit having a first end electrically connected to the first terminal of the inductor and a second end electrically connected to the second terminal of the inductor, wherein the bypass circuit comprises a first semiconductor switch and a second semiconductor switch connected in anti-series, a gate of the first semiconductor switch is controlled by a first gate control signal, the gate of the second semiconductor switch is controlled by a second gate control signal; and,
    (d) a logic circuit comprising a voltage detection circuit configured to receive a second PWM signal, an output voltage signal, a predetermined positive threshold voltage, a predetermined negative threshold voltage, and a predetermined limit voltage to generate at least three comparison results, and configured to generate the first PWM signal, the first gate control signal and the second gate control signal to enable the bypass circuit to cooperate in a plurality of predetermined modes defined by a state machine defining predetermined permissible transitions among the plurality of predetermined modes, wherein the state machine is responsive to the second PWM signal and the output voltage signal at the output node to activate at least one of the plurality of predetermined modes, wherein the plurality of predetermined modes comprises a clamping mode, and wherein the clamping mode provides a low impedance current path in parallel with the inductor.

2. The system of claim 1, wherein the logic circuit comprises:
    the state machine coupled to the voltage detection circuit to receive the at least three comparison results; and,
    a memory coupled to the state machine and containing a program of instructions that, when executed by the state machine, cause the state machine to perform operations to generate the first PWM signal and the first and second gate control signals.

3. The system of claim 2, wherein the voltage detection circuit comprises:
    a first amplifier configured to amplify the output voltage signal;
    a band pass filter configured to receive the amplified output voltage to generate a first error signal and a first processed voltage signal;
    a first comparator configured to compare the first processed voltage signal with the predetermined limit voltage to generate a first comparison result;
    a second comparator configured to compare the first error signal with the predetermined positive threshold voltage to generate a second comparison result; and,
    a third comparator configured to compare the first error signal with the predetermined negative threshold voltage to generate a third comparison result.

4. The system of claim 3, wherein operations of the state machine comprise:
    (i) determining a value of the first comparison result; and,
    (ii) if the first comparison result indicates the first processed voltage signal is no less than the predetermined limit voltage, then, retrieving configurations from the memory to force the first PWM signal to low, and generating the first gate control signal and the second gate control signal to turn both the first semiconductor switch and the second semiconductor switch on, and make both the first semiconductor switch and the second semiconductor switch work in saturation mode.

5. The system of claim 3, wherein operations of the state machine comprise:
    (i) determining values of the second comparison result;
    (ii) if the second comparison result indicates the first error signal is no less than the predetermined positive threshold voltage, then, retrieving configurations from the memory to force the first PWM signal to low and generating the first gate control signal and the second gate control signal to turn both the first semiconductor switch and the second semiconductor switch on and enable both the first semiconductor switch and the second semiconductor switch to work in saturation mode to dissipate unloading energy; and, (iii) if the second comparison result indicates the first error signal is less than the predetermined positive threshold voltage, then, retrieving configurations from the memory to output the second PWM signal as the first PWM signal and generate the first gate control signal and the second gate control signal to turn off both the first semiconductor switch and the second semiconductor switch.

6. The system of claim 3, wherein operations of the state machine comprise:

(i) determining values of the second comparison result; and, (ii) if the second comparison result indicates the first error signal is no less than the predetermined positive threshold voltage, then, retrieving configurations from the memory to turn off the main switch, turn on the freewheeling rectifier, and generating the first gate control signal and the second gate control signal to enable both the first semiconductor switch and the second semiconductor switch work in ohmic region to cause a part of an inductor current circulate through the bypass circuit to save unloading energy.

7. The system of claim 3, wherein operations of the state machine comprise:

(i) determining values of the third comparison result;

(ii) if the third comparison result indicates the first error signal is less than the predetermined negative threshold, and the first PWM signal is high, then, retrieving configurations from the memory to generate the first gate control signal and the second gate control signal to turn on both the first semiconductor switch and the second semiconductor switch; and, (iii) if the third comparison result indicates the first error signal is no less than the predetermined negative threshold, then, retrieving configurations from the memory to output the second PWM signal as the first PWM signal and generate a corresponding bypass control signal to turn off the first semiconductor switch and the second semiconductor switch.

8. The system of claim 3, wherein the band pass filter comprises:

a low-pass filter configured to receive the amplified output voltage to generate a direct current signal;

a high-frequency noise filter configured to receive the amplified output voltage to generate the first processed voltage signal; and, a summing circuit configured to subtract the direct current signal from the first processed voltage signal to generate the first error signal.

9. The system of claim 3, wherein the voltage detection circuit further comprises a second amplifier configured to amplify the first error signal when an absolute value of the first error signal is larger than the absolute value of a predetermined error threshold value, wherein a gain of the second amplifier is 1.

10. The system of claim 3, wherein the state machine is further configured to work in a corresponding mode in response to a third signal generated by a controller.

11. The system of claim 1, wherein the logic circuit comprises a gate control circuit configured to generate the first gate control signal and the second gate control signal, wherein the gate control circuit comprises a third transistor, a fourth transistor, and a fifth transistor, sources of the third transistor and the fourth transistor are commonly coupled to receive a voltage supply, drains of the third transistor and the fourth transistor are commonly coupled to a first node, a drain of the fifth transistor is coupled to the first node, a voltage signal at the first node is outputted as the first gate control signal and the second gate control signal.

12. The system of claim 11, wherein the third transistor and the fourth transistor are PMOSFETs, and the fifth transistor is an NMOSFET.

13. The system of claim 12, wherein the third transistor is a weak pull-up device with high on-resistance, the fourth transistor is a strong pull-up device with low on-resistance, and the fifth transistor is a strong pull-down device.

14. The system of claim 13, wherein in operation, the third transistor being turned on for an entire duration of a conduction period of the bypass circuit, and the fourth transistor being turned on for a portion of the entire duration of the conduction period of the bypass circuit.

15. The system of claim 1, further comprises an integrated circuit package enclosing the bypass circuit and the logic circuit.

16. A control circuit for controlling a switch-mode voltage regulator, the switch-mode voltage regulator comprising a high side switch connected between an input terminal and an intermediate switch node, a freewheeling rectification device connected between the intermediate switch node and ground, an inductor and a bypass circuit connected in parallel between the intermediate switch node and an output terminal, the bypass circuit comprising a first transistor and a second transistor, the control circuit comprises:

a third transistor;

a fourth transistor; and, a fifth transistor, wherein:

sources of the third transistor and the fourth transistor are commonly connected to receive a voltage supply, drains of the third transistor and the fourth transistor are commonly connected to a first node, and a drain of the fifth transistor is connected to the first node, such that the drains of the third transistor, the fourth transistor, and the fifth transistor selectively control a voltage signal outputted at the first node as a dedicated gate control signal to gates of the first transistor and the second transistor.

17. The control circuit of claim 16, wherein the third transistor and the fourth transistor are p-channel metal-oxide-semiconductor field effect transistors (PMOSFETs), and the fifth transistor is an n-channel metal-oxide-semiconductor field effect transistor (NMOSFET).

18. The control circuit of claim 16, wherein the third transistor is a weak pull-up device with high on-resistance, the fourth transistor is a strong pull-up device with low on-resistance, and the fifth transistor is a strong pull-down device.

19. The control circuit of claim 18, wherein in operation, the third transistor being turned on for an entire duration of a conduction period of the bypass circuit, and the fourth transistor being turned on for a portion of the entire duration of the conduction period of the bypass circuit.

20. The control circuit of claim 19, wherein the third transistor and the fourth transistor being turned on at a same time and the fourth transistor being turned off before the third transistor being turned off.

21. The control circuit of claim 16, wherein:
the third transistor is a strong pull-up device,
the fourth transistor is a weak pull-up device, and
the control circuit is configured such that a pulse time of the third transistor is selectively controllable by a gate control signal of the third transistor to establish the selectively controlled voltage signal on the gates of the first and the second transistors.

\* \* \* \* \*